(12) United States Patent
Kuchibhotla et al.

(10) Patent No.: US 7,561,879 B2
(45) Date of Patent: Jul. 14, 2009

(54) WIRELESS ACCESS NETWORK SHARING AMONG CORE NETWORKS AND METHODS

(75) Inventors: Ravi Kuchibhotla, Gurnee, IL (US); Niels Peter Skov Andersen, Roskilde (DK); Stephen A. Howell, Gloucester (GB)

(73) Assignee: Motorola, Inc., Schaumburg, IL (US)

(*) Notice: Subject to any disclaimer, the term of this patent is extended or adjusted under 35 U.S.C. 154(b) by 929 days.

(21) Appl. No.: 10/680,522

(22) Filed: Oct. 7, 2003

(65) Prior Publication Data

US 2005/0090255 A1   Apr. 28, 2005

(51) Int. Cl.
*H04W 4/00* (2006.01)

(52) U.S. Cl. ............... 455/435.2; 455/435.1; 455/552.1; 370/331

(58) Field of Classification Search ............... 455/422.1, 455/435.1–435.3, 432.1–432.2, 456.1; 370/310, 370/310.2, 335, 342, 351, 352
See application file for complete search history.

(56) References Cited

U.S. PATENT DOCUMENTS

| | | | | |
|---|---|---|---|---|
| 5,442,806 | A * | 8/1995 | Barber et al. | 455/435.2 |
| 5,862,480 | A * | 1/1999 | Wild et al. | 455/432.2 |
| 5,946,634 | A * | 8/1999 | Korpela | 455/552.1 |
| 6,085,110 | A * | 7/2000 | Nilsson | 455/552.1 |
| 6,212,390 | B1 | 4/2001 | Rune | |
| 6,223,030 | B1 * | 4/2001 | Van Den Heuvel et al. | 455/435.2 |
| 6,374,112 | B1 * | 4/2002 | Widegren et al. | 455/452.2 |
| 6,397,065 | B1 * | 5/2002 | Huusko et al. | 455/435.2 |
| 6,463,259 | B1 | 10/2002 | Kim | |
| 6,539,237 | B1 | 3/2003 | Sayers et al. | |
| 6,567,667 | B1 | 5/2003 | Gupta et al. | |
| 6,584,314 | B1 * | 6/2003 | Haumont et al. | 455/435.1 |
| 6,741,868 | B1 | 5/2004 | Park et al. | |
| 6,782,274 | B1 | 8/2004 | Park et al. | |
| 6,792,277 | B2 * | 9/2004 | Rajaniemi et al. | 455/456.1 |
| 6,795,708 | B1 * | 9/2004 | Patel | 455/450 |
| 6,801,786 | B1 * | 10/2004 | Korpela | 455/552.1 |
| 6,873,615 | B2 | 3/2005 | Ratzel | |
| 6,950,419 | B1 * | 9/2005 | Park et al. | 370/338 |

(Continued)

FOREIGN PATENT DOCUMENTS

EP    1096728 A2    2/2001

(Continued)

OTHER PUBLICATIONS

3GPP; XP-002434580 3GPP TS 23.236 V5.2.0 (Mar. 2002) Technical Specification; 36 Pages.

(Continued)

*Primary Examiner*—Erika A Gary
(74) *Attorney, Agent, or Firm*—Roland K. Bowler, II (57) ABSTRACT

A method for access network (112) sharing, for example, a GSM or UMTS 3G wireless communications radio access network (RAN), among multiple core networks (120, 12, 124 & 126), for example, wireless communications services networks, including transmitting information about the core network sharing the common access network, e.g., a pseudo network identity or the number of core networks sharing the common access network or pointer information, in a system information message. The communication device (102) uses the information provided in the system information message to connect to a core network.

24 Claims, 5 Drawing Sheets

U.S. PATENT DOCUMENTS

| | | |
|---|---|---|
| 7,280,516 B1 * | 10/2007 | Costa et al. .............. 370/338 |
| 7,305,251 B2 | 12/2007 | Kuchibhotla et al. |
| 2001/0005678 A1 | 6/2001 | Lee |
| 2001/0046859 A1 | 11/2001 | Kil |
| 2002/0072363 A1 | 6/2002 | Riihinen et al. |
| 2002/0119774 A1 | 8/2002 | Johannesson et al. |
| 2002/0147012 A1 | 10/2002 | Leung et al. |
| 2002/0193139 A1 * | 12/2002 | Mildh et al. ............. 455/552 |
| 2003/0028644 A1 | 2/2003 | Maguire et al. |
| 2003/0040311 A1 | 2/2003 | Choi |
| 2003/0040313 A1 * | 2/2003 | Hogan et al. ............. 455/435 |
| 2003/0099219 A1 | 5/2003 | Abrol et al. |
| 2003/0119481 A1 | 6/2003 | Haverinen et al. |
| 2004/0014484 A1 | 1/2004 | Kawashima |
| 2004/0017798 A1 * | 1/2004 | Hurtta et al. ............. 370/352 |
| 2004/0105429 A1 | 6/2004 | Anckar et al. |
| 2004/0162077 A1 * | 8/2004 | Kauranen et al. ......... 455/445 |
| 2004/0202736 A1 | 10/2004 | Hernandez Munoz et al. |
| 2004/0258019 A1 * | 12/2004 | Haumont et al. ........... 370/331 |
| 2005/0070281 A1 | 3/2005 | Rajkotia et al. |

FOREIGN PATENT DOCUMENTS

| | | |
|---|---|---|
| EP | 1263247 A1 | 4/2002 |
| WO | 9931917 | 6/1999 |
| WO | 0103463 A1 | 1/2001 |

OTHER PUBLICATIONS

3GPP TS 22.011 V6.1.0 (Jun. 2003) Technical Specification. 3rd Generation Partnership Project; Technical Specification Group Services and System Aspects; Service Accessibility (Release 6).

3GPP TS 23.122 V5.2.0 (Dec. 2002) Technical Specification. 3rd Generation Partnership Project; Technical specification Group Core Network; NAS Functions Related to Mobiles Station (MS) In Idle Mode (Release 5).

3GPP; TS 23.122 V3.10.0 (Sep. 2003) 3 Pages.

3GPP TR23.851 V1.0.0 (Sep. 2003) 11 Pages.

* cited by examiner

WIRELESS ACCESS NETWORK SHARING AMONG CORE NETWORKS AND METHODS

CROSS REFERENCE TO RELATED APPLICATIONS

The present application is related to U.S. Publication No. 2005-0075129-A1 entitled "Method for Selecting a Core Network and to U.S. Publication No. 2005-0117540-A1 entitled "Method and Apparatus for Routing Messages in a Network", all of which are assigned commonly, filed contemporaneously herewith, and incorporated herein by reference.

FIELD OF THE DISCLOSURE

The present disclosure relates generally to communications networks and more particularly to sharing access networks among multiple core networks, for example, the sharing of a radio access network (RAN) among multiple core networks operated by different wireless communication service providers, and methods.

BACKGROUND OF THE DISCLOSURE $3^{rd}$ Generation Partnership Project (3GPP) standardization work groups are considering the adoption of specifications enabling wireless communication network operators to deploy $3^{rd}$ Generation wireless communications core networks, e.g., Mobile Switching Centers (MSCs) and/or a Serving GPRS Support Nodes (SGSNs), that share access networks, including spectrum and/or radio control entities, e.g., a Radio Access Network (RAN). Sharing radio access networks enables network operators to accelerate the deployment of new technologies, for example, 3G wireless networks and to obtain access to radio spectrum that may not be available otherwise.

The 3GPP TS 22.011 & 23.122 specifications state procedures for Public Land Mobile Network (PLMN) selection by a mobile station (MS) through access in a radio access network (RAN). These selection rules assume that the radio access network is connected to a core network that is under control of a single network operator. The TR 23.851 communications report addresses the general topic of network sharing and contains information about core networks sharing a common wireless radio access network.

In some radio communications protocols, the network system information message has limited space available to communicate the identities of multiple core networks sharing a common access network. In the Global System for Mobile (GSM) communications protocol, for example, the system information block (SIB), which is part of a broadcast message, has insufficient space for the identities of multiple Public Land Mobile Network (PLMN) identities sharing a common radio access network (RAN).

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
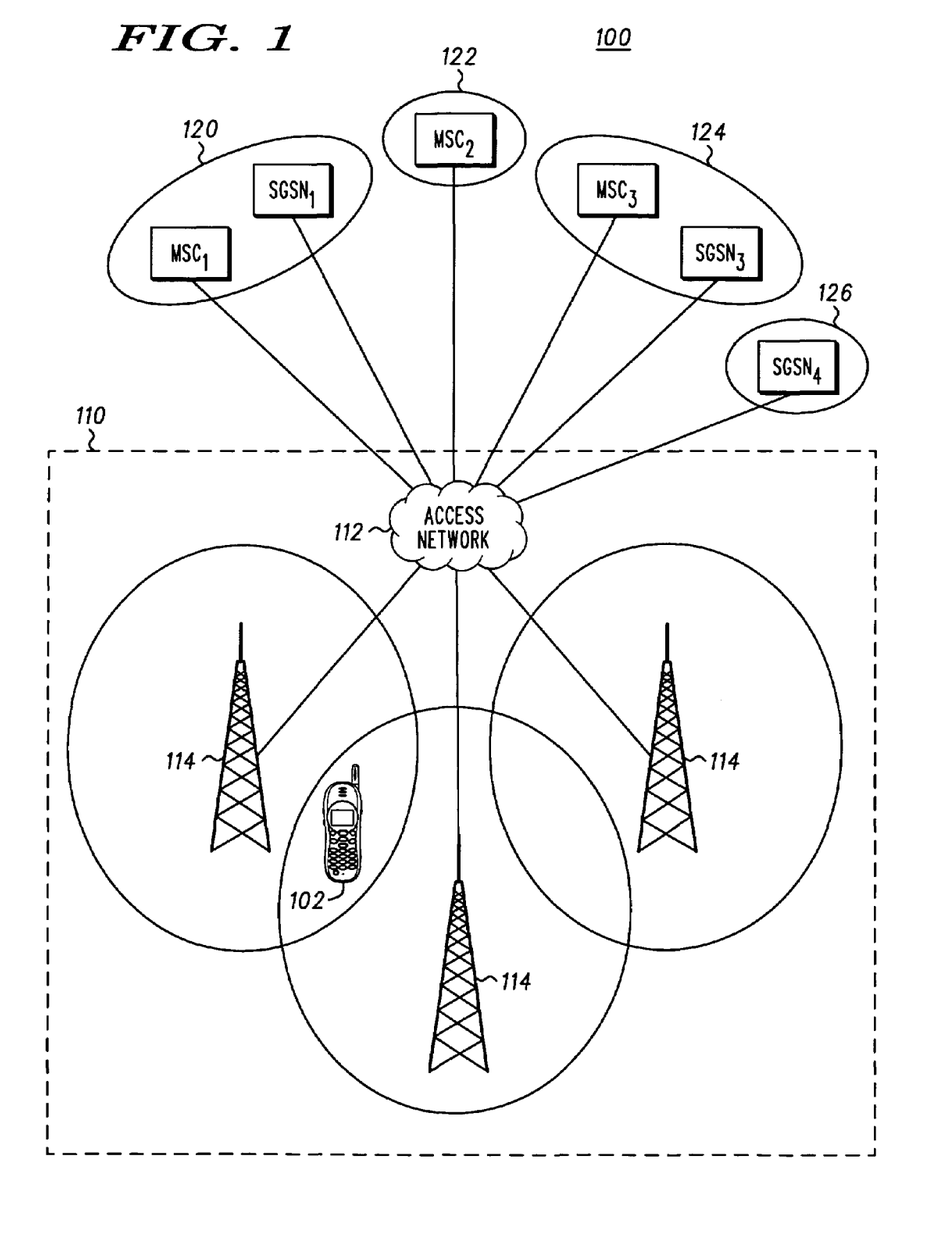
FIG. 1 is an exemplary wireless communications system including multiple core networks coupled to a common radio access network.

In FIG. 1, the exemplary wireless communications system 100 comprises generally a common access network 110 including a controller 112 communicably coupled to one or more cellular area transceivers 114 that communicate with communication devices, for example, the wireless mobile station (MS) 102, in the corresponding cells. In Global System for Mobile Communications (GSM) networks, the access network is a Radio Access Network (RAN) including a Base Station Controller (BSC) communicably coupled to one or more Base Transceiver Systems (BTS). In Universal Mobile Telecommunications System (UMTS) 3G W-CDMA communications networks, the access network is a Radio Network Subsystem (RNS) including a radio network controller (RNC) communicably coupled to a one or node B entities. In other embodiments, the access network may also comprise wireless local area network access points, for example, IEEE 802.11 access points, among other access networks points providing connectivity between communication devices and network entities. And in other embodiments, the access network is a wire-line access network, for example, a network providing access to a circuit switched network and/or to packet data network.

In FIG. 1, the wireless communications system also comprises generally multiple core networks sharing the common access network 110. In the exemplary wireless communications system of FIG. 1, a first core network 120 includes a Mobile Switching Center ($MSC_1$) and a Serving GPRS Support Node ($SGSN_1$), a second core network 122 includes only a Mobile Switching Center ($MSC_2$), a third core network 124 includes a Mobile Switching Center ($MSC_3$) and a Serving GPRS Support Node ($SGSN_3$), and a fourth core network 126 includes only a Serving GPRS Support Node ($SGSN_4$). The exemplary core networks 120, 122, 124 & 126 all share the same radio access network 110 and its radio spectrum. The exemplary core networks may be GSM networks or UMTS 3G networks. Other core networks capable of sharing a common radio access network include CDMA 2000 networks and other existing and future wireless communications networks. In other embodiments, the core network is a wire-line network, for example, a public telephone switched network (PTSN), and/or a packet data network, for example, a digital cable network, or a TCP/IP network, or an Integrated Services Digital Network (ISDN), etc.

Generally, different service providers operate each of the multiple core networks, which are identified by different core network identities, for example, by a corresponding Public Land Mobile Network (PLMN) identity (ID). In some embodiments, in addition to the core network identity, the core networks have associated therewith core network information including domain support information, for example, a packet switched domain indicator and/or a circuit switched domain indicator. A system information message, for example, a radio broadcast message from the network, provides information for use by communication devices, e.g., mobile station 102 in FIG. 1, in the network for connecting to one of the core networks. When attempting to connect to a network, generally, the communication device sends a connection request, which may include the identity of the device, e.g., an MSID, location area information, the identity of a home core network, e.g., the HPLMN, of the communication device, preferred core network information, e.g., preferred PLMNS, etc. The particular protocols, criteria and procedures for connecting to, or registering with, core networks are usually specified by corresponding communications specifications.

Figure 2:
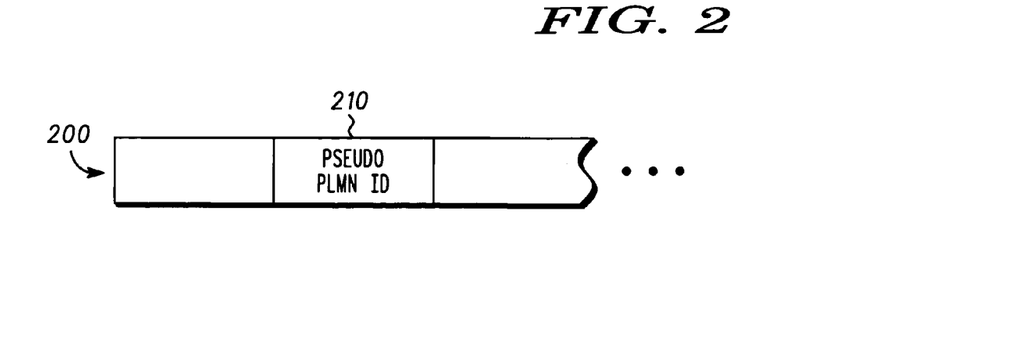
FIG. 2 is an exemplary system information message including pseudo core network identification information identifying multiple networks sharing a common access network.

In one embodiment, illustrated in FIG. 2, the system information message 200 includes an information block, for example, a core network-identifying portion of the system information message, with a pseudo network identity, e.g., a pseudo PLMN ID, 210 identifying multiple core networks sharing a common access network. In other embodiments, the pseudo core network identity may be located elsewhere in the system information message or in some other message. The pseudo identity in this embodiment is not associated with any particular core network. In at least some embodiments, the system information message is devoid of the identities, e.g., the proper identities, of any particular core network sharing the common access network. In a one particular implementation, a pseudo PLMN ID is located in an existing PLMN ID data field of an existing Release 5 GSM system information broadcast message. This exemplary implementation does not require a change to the structure of the existing Release 5 GSM system information broadcast message.

Figure 3:
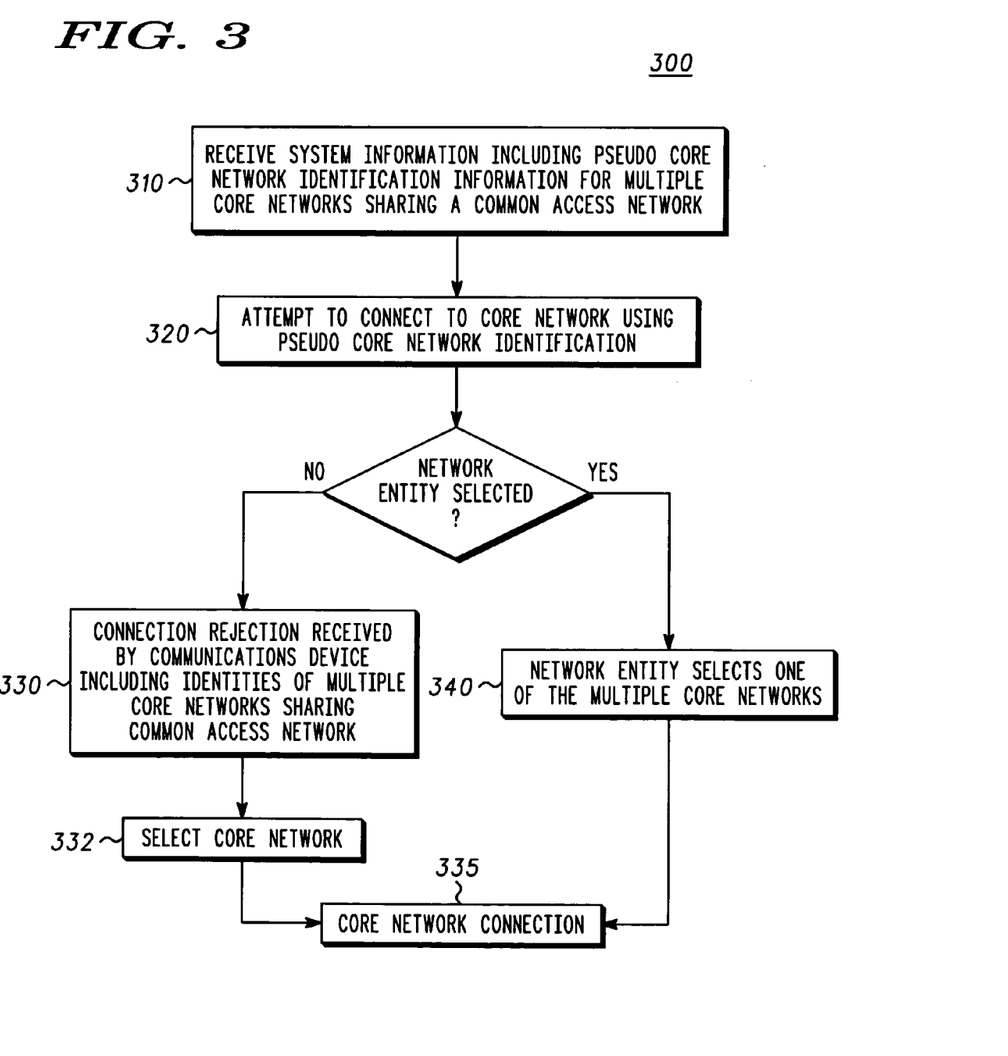
FIG. 3 is an exemplary process diagram for connecting to a core network using pseudo core network identification information.

In the process diagram 300 of FIG. 3, at block 310, a communication device, for example, the mobile station 102 in FIG. 1, receives system information with pseudo core network identification information, for example, a pseudo PLMN ID. An exemplary system information message including this information is discussed above. At block 320, the communication device attempts to connect to a core network using the pseudo identification information, for example, by transmitting a connection or registration request including the pseudo identity and other information, which may be required pursuant to the particular connection protocol under consideration.

In one embodiment where the core network pseudo identity identifies multiple core networks sharing the common access network, the connection request based on the pseudo core network identity is rejected, since no particular network has been identified. In one embodiment, under these exemplary circumstances, at block 330, the communication device receives, for example, in the connection rejection message, the identities of the multiple core networks sharing the common core network. In another embodiment, the communication device also receives the core network domain identity that is supported by the core network, for example, a circuit switched domain and/or packet switched domain. In another embodiment, the communication device receives a list of services supported by the core network. The communication device may use any one or more of the foregoing information when performing core network selection.

In some embodiments, the connection rejection includes a new cause value to ensure that the communication device does not add the pseudo identity, e.g., pseudo PLMN ID, to a forbidden list of the communication device. In other embodiments the communication device stores the identity of both the pseudo PLMN and the assigned PLMN in either a Subscriber Identification Module (SIM) or a User Identification Module (UIM) or the communication device itself in order to assist in speeding up the core network selection process in subsequent connection attempts. In other embodiments, the communication device stores the identity of the pseudo PLMN and the core network rejecting the registration attempt in the SIM or UIM card or in the communication device.

In FIG. 3, at block, 332, having identified at least some of the core networks sharing the common access network, the communication device selects and attempts to connect to one of the core networks identified by sending a new connection request with the identification of the selected core network with any other information required pursuant to the applicable communications protocol. FIG. 3, at block 335, the device connects to the core network selected by the communication device.

In one embodiment, the communication device automatically selects the core network to which the communication device attempts to connect among the multiple core networks sharing the common access network. For example, the selection may be random or it may be based on an orderly or sequential selection process, for example, a round-robin selection. Also, the automated selection process may be weighted so that some core networks are selected proportionately more than others. In other embodiments, the communication device presents the multiple core wireless communications networks, for example, on a display, for manual selection. In some manual selection embodiments, the order of presentation of the multiple core wireless communications networks is changed when presented for selection.

In another embodiment where the core network pseudo identity identifies multiple core networks sharing a common access network, a network entity selects one of the multiple core networks to which the communication device attempts to connect, as illustrated in FIG. 3, at block 340. According to this embodiment, the communication device may indicate to the network entity that the communication device has no preference for selecting a particular core network. This information may be communicated to the network either expressly, e.g., in the connection request, or by implication. In one embodiment, the network entity may select the core network to which the communication device attempts to connect in a random process. In another embodiment, the network entity may select the core network to which the communication device attempts to connect in a round-robin fashion. An exemplary message having a dedicated field for authorizing the network to make the selection is discussed below. In FIG. 3, at block 335, the communication device connects to the core network selected by the network entity.

In another embodiment, the communication device sends, for example, in the connection request, preferred core network information to a network entity. The preferred core network provider information may or may not include the home core network information, e.g., the HPLMN, of the communication device. The network entity then selects a core network for the communication device giving consideration to the preferred core network information received from the communication device. This scheme could be used to avoid sending the list of core networks from the access network to the communication device in response to receiving a connection request based on a pseudo identity representative of multiple core networks.

In another embodiment, the communication device sends the identity of the communication device to a network entity. The identity can include, for example, International Mobile Subscriber Identity (IMSI), International Mobile Equipment Identity (IMEI), Temporary Mobile subscriber Identity (TMSI) among others. In one embodiment, the communication device sends its identity to the network with the connection request, and in another embodiment the network entity requests the identity of the communication device, for example, in response to receiving a connection request, devoid of the communication device identity, from the communication device. The network entity selects a core network from multiple core networks sharing a common access network for the communication device based on the communication device identity.

Figure 4:
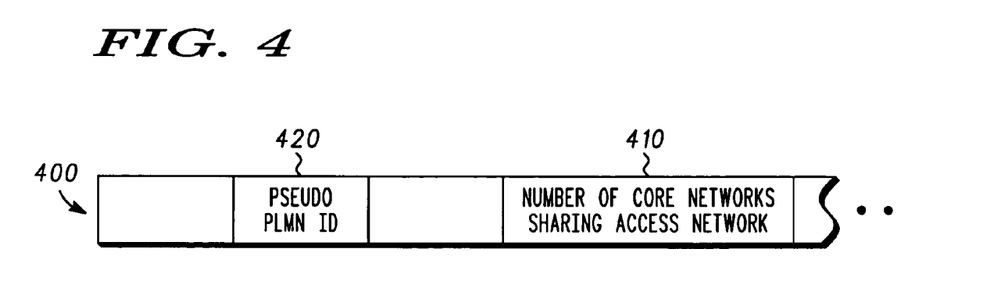
FIG. 4 is an exemplary system information message having a data field for indicating a number of multiple core networks sharing a common access network.

In another embodiment, illustrated in FIG. 4, the system information message 400 includes an information block, for example, a core network-identifying portion of the system information message, having a data field 410 for identifying how many multiple wireless communications core networks share a common access network. In other embodiments, the data field indicating how many core networks share the common access network is located elsewhere in the system information message or in some other message. In at least one embodiment including a data field indicating how many core networks share the common access network, the system information message is devoid of any core network identity information, e.g., the proper core network identities. In one embodiment, the number is indicative of a number of core networks having different corresponding core networks identities. In another embodiment, the number is indicative of at least some core networks having different identities wherein at least some core networks having the same identity are counted more than once, for example, for weighting purposes, as discussed further below.

In another embodiment, illustrated in FIG. 4, the system information message also includes pseudo core network identity information 420 identifying multiple core networks sharing a common access network, as discussed above, in addition to the information identifying how many multiple wireless communications core networks share the common access network. The exemplary implementation of the system information message including information identifying how many multiple wireless communications core networks share the common access network may require a change to the structure of existing communications system information messages, for example, the Release 5 GSM system information broadcast message.

Figure 5:
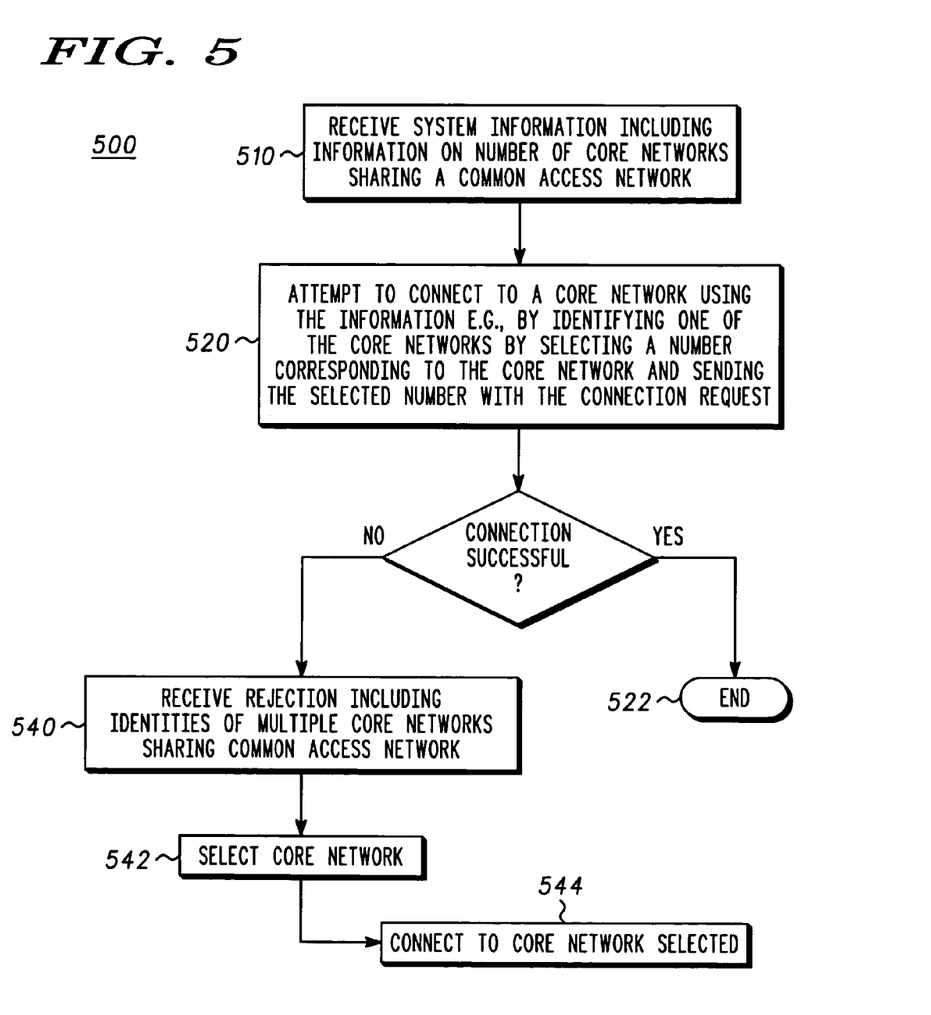
FIG. 5 is an exemplary process diagram for connecting to a core network without using core network identification information in the first instance.

In the process diagram 500 of FIG. 5, at block 510, a communication device receives a system information message with information indicating how many core networks share a common access network. An exemplary system information message structure including this information is discussed above. In one embodiment, the message is devoid of core network identity information, e.g., PLMN IDs, particularly identifying the multiple core networks sharing the common access network.

In FIG. 5, at block 520, the communication device attempts to connect to a core network using the information about the number of multiple core networks sharing the access network. In one embodiment, each of the multiple core networks sharing the common access network is associated with a corresponding number within a range specified by the number of multiple core networks. As suggested above, in some embodiments, more than one number may be assigned to the same core network. In embodiments where the system information message does not include information identifying the core networks sharing the common access network, the communication device may attempt to connect to a core network by specifying a number associated with the core network to which the communication device attempts to connect, without specifically identifying the core network by its proper identity, e.g., its PLMN ID. For example, if the system information message indicates that there are four (4) core networks sharing the common access network, number one (1) may correspond to one core network, numbers two and three (2 & 3) may correspond to another core network, etc. The communication device may thus identify one of the core networks by including its corresponding number in the connection request, without knowledge of its core network identification per se. In one embodiment, the communication device selects the core network to which it attempts to connect by a random selection process, so that the multiple core networks sharing the common access network have substantially an equal opportunity of being selected. The random selection process may be employed, for example, when none of the multiple core networks are on a preferred service provider list of the communication device, but where all of the core networks satisfy a threshold condition, e.g., based on quality or signal strength. If the initial connection attempt is successful the process ends at block 522.

More generally, N core networks may share the access network, and the N core networks can be further divided into up to M sub-core networks. One form of sub-core network differentiation is in the form of dividing the core network into a circuit switched core network and a packet switched core network. The circuit switched core network is connected typically to a public switched telephone network while the packet switched core network is connected to a packet network such as the Internet. Information about N and M can be provided to the communication device through the broadcast message and/or through dedicated messaging such as the connection reject message. The M sub-core-networks can refer to the different core network domains, e.g., circuit switched domain and/or packet switched domain that the corresponding core network supports. A core network may also support only one core network domain, in which case M=1 for this core network.

In FIG. 5, at block 540, if the connection attempt is unsuccessful, the communication device receives a connection rejection from the network. In one embodiment, the communication device also receives the identities of at least some of the multiple core networks sharing the common core network, for example, the identities of all sharing core networks except the network for which the rejection was received. In another embodiment, the communication device also receives the identity of the core network that rejected the connection attempt by the communication device. The communication device may use this information to prevent future attempts to connect to certain core networks.

In FIG. 5, at block 542, in one embodiment, the communication device selects and attempts to connect to one of the core networks specifically identified, e.g., by PLMN ID, by sending a new connection request with the identification of the selected core network pursuant to the applicable communications protocol. The core network selection may be made automatically or manually, as discussed above or pursuant to some other scheme.

Figure 6:
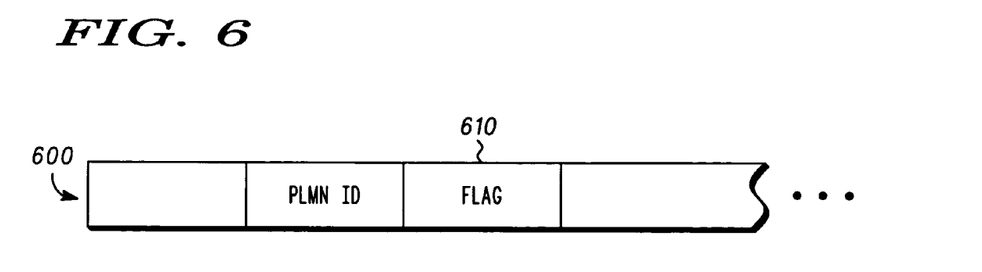
FIG. 6 is an exemplary connection request message having a data field for indicating that a network entity may select one of several core networks on behalf of a communication device.

In another embodiment, the communication device permits a network entity to select the core network, for example, by transmitting a connection request with information indicating that the network should make the core network selection for the communication device. In one embodiment, the communication device includes information about the core network domain identity and/or the service desired in the connection request. FIG. 6 illustrates an exemplary message 600 having a dedicated data field 610, for example, a one-bit flag that is either set or not set by the communication device, to indicate whether the network may select a core network on behalf of the communication device. In FIG. 5, at block 544, the communication device connects to the core network selected either by the communication device or by the network entity.

Figure 7:
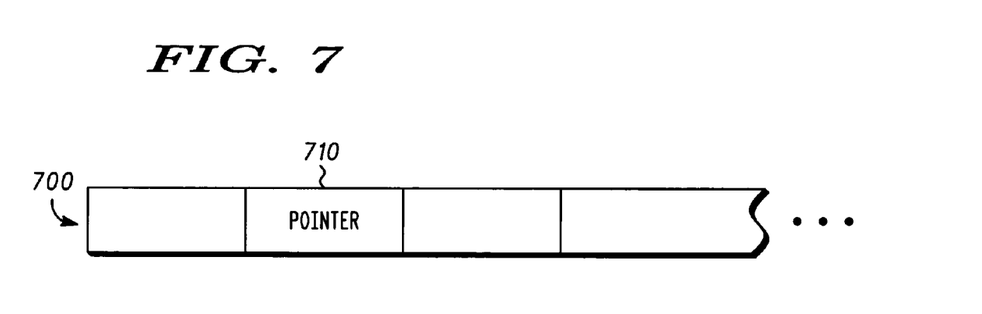
FIG. 7 is an exemplary system information message having a pointer indicating where to obtain information about multiple core networks sharing a common access network.

In another embodiment, illustrated in FIG. 7, the system information broadcast message 700 includes an information block, for example, a core network identifying portion of the system information broadcast message, having a pointer 710 to a location where information, e.g., PLMN identities, for multiple wireless communications core networks sharing a common access network may be obtained. In at least one embodiment, the system information message including the pointer is devoid of the core network identity information particular to any of the core networks sharing the common access network. In another embodiment, the system information message also includes pseudo core network identity information 720 identifying the multiple core networks sharing a common access network as discussed above, in addition to the pointer information. The exemplary implementation of the system information message including information identifying how many multiple wireless communications core networks share the common access network may require a change to the structure of existing communications system information messages, for example, the Release 5 GSM system information broadcast message.

Figure 8:
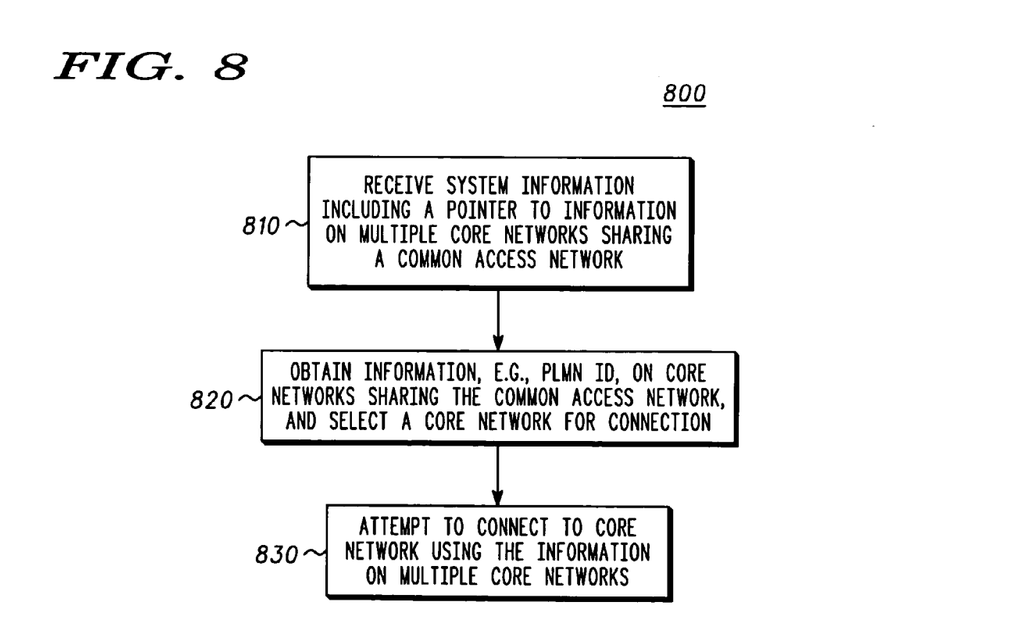
FIG. 8 is an exemplary process diagram for obtaining information on multiple core networks sharing a common access network using pointer information.

In the process diagram 800 of FIG. 8, at block 810, a communication device receives a system information message including pointer information indicating where the communication device may obtain information about multiple core networks sharing a common access network from which the message was received. In one embodiment, the pointer refers to another portion of the system information message, or to some other message or location where either the identities of the core networks sharing the common access network may be found, or alternatively where more specific pointer information may be found.

In FIG. 8, at block 820, the communication device obtains information on sharing core networks using the pointer. In one embodiment, the pointer points to a location where identities, for example, the PLMN IDs, of at least some of the sharing core networks may be obtained. In another embodiment, the pointer references another location with more specific information where the identities of the sharing core networks may be obtained. In this exemplary embodiment, the communication device obtains identities, e.g., a PLMN or pseudo identity, for at least one of the core networks sharing the common access network. At block 830, the communication device attempts to connect to one of the multiple core networks using the information, e.g., the PLMN IDs, of the multiple core networks sharing the common access network. The communication device may select the one of the multiple core networks to which it attempts to connect either manually or automatically as discussed above.

In one embodiment, the communication device attempts to connect to the one of the multiple core networks using information about multiple core networks sharing a common access network from which the system information was received only upon satisfaction of a condition. If the system information message includes pseudo identity information for multiple core networks sharing a common access network, the communication device may attempt to connect to a core network using the common identity if the condition is not satisfied.

Figure 9:
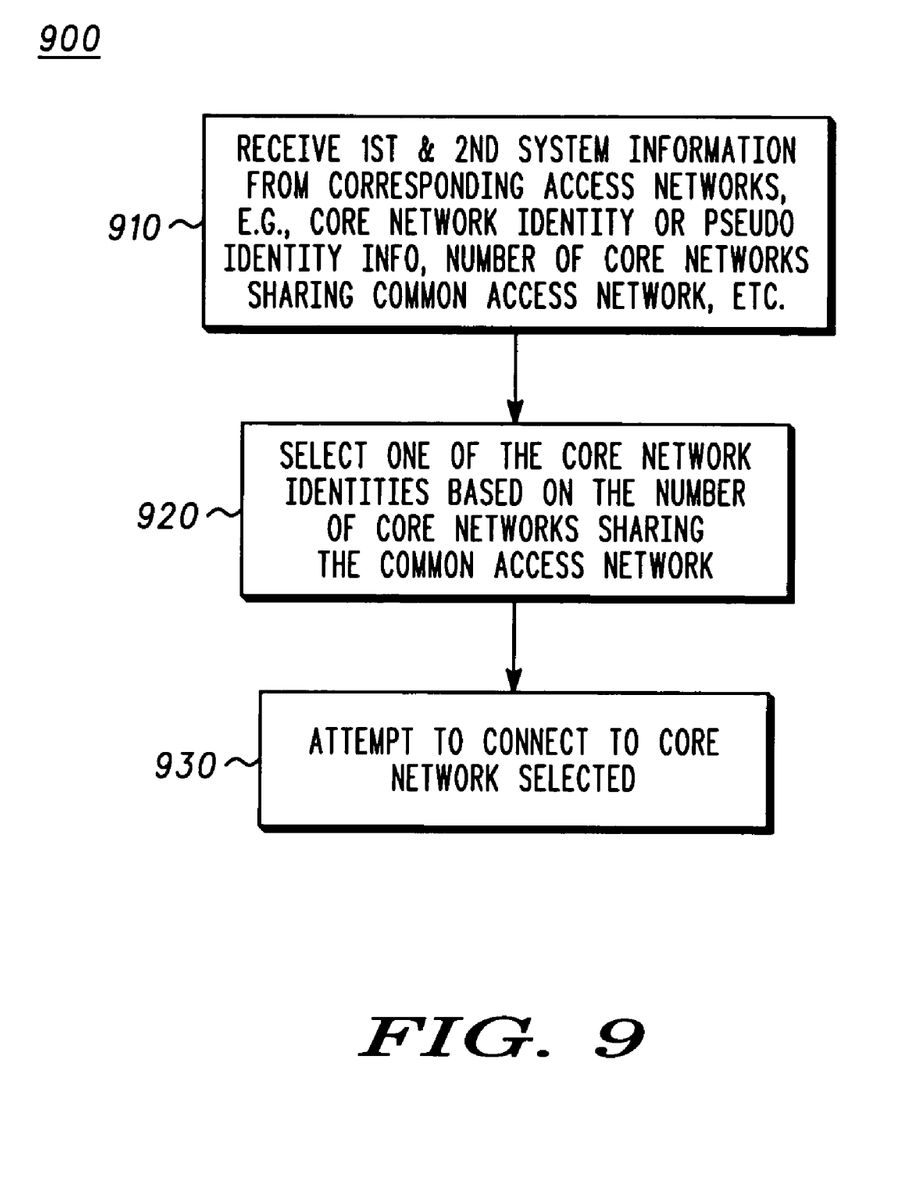
FIG. 9 is an exemplary process diagram for selecting from among two or more network identities, at least one of which is associated with multiple core networks sharing a common access network.

In the process diagram 900 of FIG. 9, at block 910, the communication device receives first and second system information corresponding first and second access networks. The first and second system information includes corresponding identity information, for example, PLMN IDs for multiple core networks or a pseudo PLMN ID identifying multiple core networks. FIG. 1 illustrates only a single access network, but generally the communication device 102 may receive system information from more than one access network. In one embodiment, at least one of the system information messages also includes information on multiple core networks sharing the corresponding access network, for example, the number of core networks sharing the same access network, as discussed above in connection with FIG. 4.

In FIG. 9, at block 920, under some selection circumstances, for example, where both access networks satisfy a signal quality condition, the communication device may be required to select one of the first and second core network identities for a connection attempt. In some embodiments, it is desirable to base the selection on the number of core networks sharing the corresponding first and second access networks. For example, if there are three times as many core networks sharing the first access network compared to the number of core networks sharing the second access network, the PLMN selection is based on a proportionate weighting of the first and second PLMNs.

In FIG. 9, at block 930, if the selected network identity is a pseudo identity, e.g., pseudo PLMN ID, representative of multiple core networks sharing a common access network, the communication device selects one of the multiple core networks sharing the corresponding access network based on information in the corresponding system information message, for example, as discussed above in connection with FIG. 5. In some embodiments, at least in the first instance, the selection is made without specifying the particular identity of the core network to which the communication device attempts to connect.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the spirit of the disclosure, the scope of which is to be limited not by the exemplary embodiments but by the appended claims.

What is claimed is:

1. A method in a communication device, the method comprising:
   receiving network system information,
   the network system information including information about multiple core networks sharing a common access network without identifying the multiple core networks;
   attempting to connect to a core network based on the information about multiple core networks sharing the common access network.

2. The method of claim 1,
automatically selecting the core network to which the communication device attempts to connect among the multiple core networks sharing the common access network.

3. The method of claim 1,
presenting the multiple core networks for manual selection at the communication device,
changing the order of presentation of the multiple core networks.

4. The method of claim 1, attempting to connect to the core network identified by a network entity.

5. The method of claim 1,
the information about the multiple core networks sharing the common access network includes information indicating how many multiple core networks share the common access network,
selecting the core network to which the communication device attempts to connect by selecting one of the multiple core networks without knowing identities of the multiple core networks.

6. The method of claim 1,
the information about the multiple core networks sharing the common access network includes a number corresponding to the number of multiple core networks sharing the common access network,
each of the multiple core networks associated with a corresponding number within a range specified by the number of multiple core networks sharing the common access network,
attempting to connect to the core network includes transmitting a message specifying the number associated with the core network to which the communication device attempts to connect.

7. The method of claim 1,
the information about the multiple core networks sharing the common access network includes a number corresponding to the number of multiple core networks sharing the common access network,
each of the multiple core networks associated with a corresponding number within a range specified by the number of multiple core networks sharing the common access network,
at least some of the multiple core networks sharing the common access network having corresponding different core network identities,
attempting to connect to the core network includes transmitting a message specifying the number associated with the core network to which the communication device attempts to connect.

8. The method of claim 1,
receiving a connection rejection from the core network to which the communication device attempts to connect,
receiving identities for at least some of the multiple core networks sharing the common access network.

9. The method of claim 8, receiving an identity of the core network to which the communication device attempts to connect.

10. The method of claim 8, attempting to connect to the core network based on a selection of the core network made at one of the communication device and a network entity.

11. The method of claim 1,
receiving network system information includes receiving system information in a wireless broadcast message,
the system information including information about multiple core networks sharing a common radio access network without identifying the multiple core networks;
attempting to connect to a core network based on the system information about multiple core networks sharing the common radio access network.

12. The method of claim 1, attempting to connect to the core network includes sending a connection request, the connection request including an identity of a home core wireless communications network of the wireless communication device.

13. The method of claim 1, attempting to connect to the core network includes sending a connection request, the connection request including identities of at least some preferred core wireless communications networks.

14. A method in a communication device, the method comprising:
receiving system information,
the system information including pointer information indicating where the communication device may obtain information about multiple core networks sharing a common access network from which the system information was received,
the system information including a common identity for the multiple core networks sharing the common access network;
attempting to connect to one of the multiple core networks using the information about multiple core networks sharing the common access network from which the system information was received upon satisfaction of a condition.

15. The method of claim 14, selecting the one of the multiple core networks to which the communication device attempts to connect using the information about multiple core networks sharing the common access network from which the system information message was received.

16. The method of claim 14, obtaining an identity for the core network to which the communication device attempts to connect using the pointer information.

17. The method of claim 14,
attempting to connect to a core network using the common identity when the condition is not satisfied.

18. A method in a communication device, the method comprising:
receiving system information,
the system information including a pseudo identity, the pseudo identity common to multiple core networks sharing common access network;
receiving multiple core network identities corresponding to the multiple core networks sharing the common access network in response to attempting to connect to a core network using the pseudo identity.

19. A method in a communication device, the method comprising:
receiving first system information from a first access network and receiving second system information from a second access network, the first system information including a first core network identity and information on how many core networks share the first access network, the second system information including a second core network identity,
selecting one of the first and second core network identities based on the number of core networks sharing the first access network.

20. The method of claim 19,
weighting the first identity based on the number of core networks sharing the first access network,
weighting the second identity based on the number of core networks sharing the second access network, selecting the one of the first and second identities based on the weighted first and second identities.

21. The method of claim 19, selecting the one of the first and second identities randomly.

22. The method of claim 19, selecting the one of the first and second identities only if the first and second access networks satisfy a quality condition.

23. The method of claim 19,
the selected one of the first and second core network identities is a pseudo identity common to multiple core networks sharing the corresponding access network, after selecting the core network identity, selecting one of the multiple core networks sharing the corresponding access network based on information in the corresponding system information.

24. The method of claim 23, selecting the one of the multiple core networks without specifying the identity of the core network selected.

* * * * *